(12) United States Patent
Hartwich et al.

(10) Patent No.: US 10,318,373 B2
(45) Date of Patent: Jun. 11, 2019

(54) USER STATION FOR A BUS SYSTEM, AND METHOD FOR CHECKING THE CORRECTNESS OF A MESSAGE

(71) Applicant: Robert Bosch GmbH, Stuttgart (DE)

(72) Inventors: Florian Hartwich, Reutlingen (DE); Arthur Mutter, Neuhausen (DE); Christian Horst, Dusslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 151 days.

(21) Appl. No.: 15/505,301

(22) PCT Filed: Aug. 4, 2015

(86) PCT No.: PCT/EP2015/067927
§ 371 (c)(1),
(2) Date: May 9, 2017

(87) PCT Pub. No.: WO2016/026689
PCT Pub. Date: Feb. 25, 2016

(65) Prior Publication Data
US 2017/0235630 A1    Aug. 17, 2017

(30) Foreign Application Priority Data
Aug. 20, 2014    (DE) .................. 10 2014 421 654

(51) Int. Cl.
*H04L 1/00* (2006.01)
*H04L 12/40* (2006.01)
(Continued)

(52) U.S. Cl.
CPC ........ *G06F 11/1004* (2013.01); *H04L 1/0061* (2013.01); *H04L 12/40013* (2013.01);
(Continued)

(58) Field of Classification Search
CPC .......... H04L 12/40013; H04L 12/4135; H04L 2001/0094; H04L 2012/40215; H04L 2012/40273; H04L 1/0061; G06F 11/1004
See application file for complete search history.

(56) References Cited

U.S. PATENT DOCUMENTS

| | | | |
|---|---|---|---|
| 2004/0081079 A1* | 4/2004 | Forest | H03M 13/43 370/216 |
| 2012/0189021 A1* | 7/2012 | Hartwich | H04L 12/413 370/438 |
| 2016/0043947 A1* | 2/2016 | Nickel | H04L 69/22 370/392 |

OTHER PUBLICATIONS

International Search Report dated Nov. 25, 2015, of the corresponding International Application PCT/EP2015/067927 dated Aug. 4, 2015.

(Continued)

*Primary Examiner* — Guy J Lamarre
(74) *Attorney, Agent, or Firm* — Norton Rose Fulbright US LLP; Gerard Messina

(57) ABSTRACT

A user station for a bus system and a method for checking the correctness of a message, in which the user station includes a communication control unit for writing or reading at least one message for/from at least one further user station of the bus system, in which an exclusive, collision-free access by a user station to a bus line of the bus system is ensured at least intermittently, a checksum generator for generating a checksum for the message to detect bit errors in the message, and a configuration register for specifying the initialization value with which the checksum generator is to be preloaded to start the message, the initialization value being changeable as necessary even following a communication with the communication control unit.

8 Claims, 2 Drawing Sheets

(51) Int. Cl.
*H04L 12/413* (2006.01)
*G06F 11/10* (2006.01)
*H03M 13/00* (2006.01)

(52) U.S. Cl.
CPC .. *H04L 12/4135* (2013.01); *H04L 2001/0094* (2013.01); *H04L 2012/40215* (2013.01); *H04L 2012/40273* (2013.01)

(56) References Cited

OTHER PUBLICATIONS

ISO 11898-1: Road Vehicles—Controller Area Network (CAN)—Part 1: Data Link Layer and Physical Signaling, 2003.
"CAN with Flexible Data-Rate Specification Version I.0", Robert Bosch GmbH, Apr. 17, 2012.

* cited by examiner

USER STATION FOR A BUS SYSTEM, AND METHOD FOR CHECKING THE CORRECTNESS OF A MESSAGE

FIELD OF THE INVENTION

The present invention relates to a user station for a bus system, and to a method for checking the correctness of a message which is transmitted in the bus system, the user station and the method making it possible to configure an initialization value for a checksum generator.

BACKGROUND INFORMATION

The CAN bus system has become widely used for communication between sensors and control units. For example, the CAN bus system is utilized in automobiles. In the CAN bus system, messages are transmitted with the aid of the CAN protocol, as is described in ISO11898. Automotive bus systems, in particular, are being continuously developed toward greater bandwidths, shorter latency times, and stricter real-time capability. In addition, technologies were recently proposed for this purpose, such as, for example, CAN FD, in which messages are transmitted according to the specification "CAN with Flexible Data-Rate, Specification Version 1.0" or corresponding to ISO11898-1 which is currently being revised (presently available as ISO11898-1 CD), etc. In such technologies, the maximum possible data rate is increased to a value greater than 1 MBit/s by using a higher clock pulse in the area of the data fields. Such messages are also referred to in the following as CAN FD frames or CAN FD messages.

The expansion of the CAN standard was not only supplemented primarily with functions, such as, e.g., TTCAN, the CAN standard but was also recently expanded further with CAN FD, particularly with respect to the possible (higher) data rate and the usable data packet size, the inherent CAN properties being retained, particularly in the form of the arbitration.

Problems exist at this time with regard to a calculation of the checksum of a CAN FD frame when the identifier of the CAN FD frame begins with four dominant bits. These four dominant bits, together with one dominant starting bit of the CAN FD frame, which is also referred to as the start-of-frame bit, form a so-called stuff condition, according to which a recessive stuff bit is inserted between the fourth and fifth bits of the identifier. In this case, if the dominant starting bit of the CAN FD frame is overwritten locally with a recessive bit in a recipient of the CAN FD frame, the recipient of the CAN FD frame interprets the first dominant bit of the identifier as the starting bit of the frame. Since there is no stuff condition in the recipient due to the received recessive stuff bit, the recipient will accept the recessive stuff bit as the fourth bit of the identifier. The next bit is accepted as the fifth bit of the identifier and the recipient will be back in phase with the sender. In this case, however, the changed fourth bit of the identifier is not recognized in the checksum at the end of the CAN FD frame. For example, an identifier 0x001 transmitted by the sender is received by the recipient as 0x081. This applies both for the 11-bit identifier and for the 29-bit identifier in the case of CAN FD.

SUMMARY OF THE INVENTION

An object of the present invention is therefore to provide a user station for a bus system and a method for checking the correctness of a message, which solve the aforementioned problems. In particular, a user station for a bus system and a method for checking the correctness of a message, which may reliably detect bit errors in a message transmitted or received in the bus system, are to be provided.

The object may be achieved by a user station for a bus system having the features described herein. The user station includes a communication control unit for writing or reading at least one message for/from at least one further user station of the bus system, in which exclusive, collision-free access by a user station to a bus line of the bus system is ensured at least intermittently, a checksum generator for generating a checksum for the message in order to detect bit errors in the message, and a configuration register for specifying the initialization value with which the checksum generator is to be preloaded in order to start the message, the initialization value being changeable as necessary even following a communication with the communication control unit.

With the aid of the user station it is possible to change or render configurable, as necessary, a previously fixedly specified initialization value for a checksum generator. As a result, the user station, specifically its checksum generator, may operate using both the previous initialization value of "0x00000" as well as a new initialization value to be established. As a result, bit errors in a message of the bus system may be reliably detected by forming a checksum.

Due to the freely selectable specification of the initialization value for the checksum generator, the user station is easily adaptable to further developments of the message transmission standard. Even if a decision is made, in particular for CAN FD, to not change the standard, a conformance test may be passed with the aid of the user station. The user station may then optionally also communicate with other, already existing CAN FD user stations which utilize the presently established initialization value.

Advantageous further embodiments of the user station are described in the further descriptions herein.

According to one exemplary embodiment, the configuration register may be configured as an overwritable memory.

According to yet another exemplary embodiment, the configuration register may include: at least one changeable configuration bit, and at least two initialization values as permanently stored values, the at least one changeable configuration bit indicating the at least two initialization values with which the checksum generator must be preloaded in order to start the message.

It is conceivable that the user station also includes: one further checksum generator for generating a checksum for the message in order to recognize bit errors in the message, and one further configuration register for specifying the initialization value with which the further checksum generator is preloaded in order to start the message, the checksum generator being configured for generating a checksum for a message, which includes fewer than a predetermined number of data bytes, and the further checksum generator is configured for generating a checksum for a message, which includes more than the predetermined number of data bytes. In this case, the predetermined number of data bytes may be 16.

In the above-described user station, the communication control unit may include the configuration register and the further configuration register.

The at least one message may be a CAN FD message.

The above-described user station may be part of a bus system which also includes a parallel bus line and at least two user stations which are connected to one another via the bus line in such a way that they may communicate with each other. In this case, at least one of the at least two user stations is an above-described user station.

The above-mentioned object is also achieved by a method for checking the correctness of a message according to the description herein. In this case, the message is to be written or read with the aid of a communication control unit of a user station for/from at least one further user station of the bus system, in which exclusive, collision-free access by a user station to a bus line of the bus system is ensured at least intermittently, the method including the steps of: specifying, with the aid of a configuration register, the initialization value with which a checksum generator is preloaded in order to start the message, a checksum for the message needing to be calculated with the aid of the checksum generator in order to detect bit errors in the message, and changing the initialization value as necessary even after a communication with the communication control unit.

The method offers the same advantages as those mentioned above with reference to the user station.

Further possible implementations of the present invention also include non-explicitly mentioned combinations of features or specific embodiments described above or in the following with respect to the exemplary embodiments. In this case, those skilled in the art will also add individual aspects as improvements or additions to the particular basic form of the present invention.

The present invention is described in greater detail in the following with reference to the attached drawing and on the basis of exemplary embodiments.

In the figures, identical or functionally identical elements are labeled using the same reference numerals, unless indicated otherwise.

DETAILED DESCRIPTION

Figure 1:
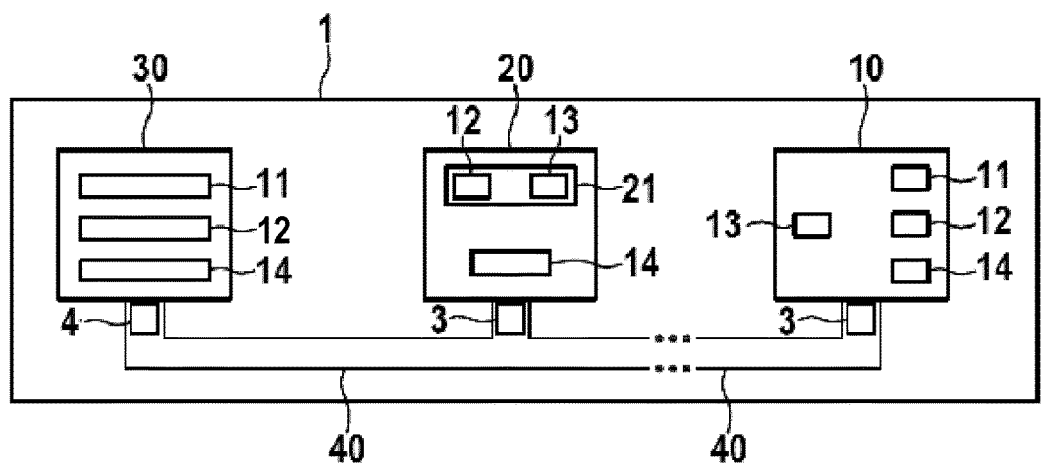
FIG. 1 shows a simplified block diagram of a bus system according to one first exemplary embodiment.

FIG. 1 shows a bus system 1 which may be, for example, a CAN bus system, a CAN FD bus system, etc. Bus system 1 may be utilized in a vehicle, in particular in a motor vehicle, an aircraft, etc., or in a hospital, etc.

In FIG. 1, bus system 1 includes a plurality of user stations 10, 20, 30, each of which is connected to a bus line 40. Via bus line 40, messages 3, 4 in the form of signals may be transmitted between individual user stations 10, 20, 30. User stations 10, 20, 30 may be, for example, control units or display devices of a motor vehicle.

As shown in FIG. 1, user station 10 includes a communication control unit 11, a checksum generator 12, a configuration register 13, and a transceiver 14. User station 20, however, includes a communication control unit 21 which includes a checksum generator 12 and a configuration register 13, and a transceiver 14. User station 30 includes a communication control unit 11, a checksum generator 12, and a transceiver 14. Transceivers 14 of user stations 10, 20, 30 are each directly connected to bus line 40, even if this is not represented in FIG. 1.

As shown in FIG. 1, user stations 10, 20, 30 each include a checksum generator 12. User stations 10, 20 each also include a configuration register 13. In user station 20, checksum generator 12 and configuration register 13 are part of communication control unit 21. There is no configuration register 13 in user station 30, since the initialization value is fixedly specified with a fixed initialization value or initialization vector, for example "0x00000", before communication begins in bus system 1, and is unchangeable. In this case, the prefix "0x" stands for the hexadecimal representation of the initialization value, hexadecimal 0x0 corresponding to "0000" in binary representation, and hexadecimal "0xA" corresponding to "1010" in binary representation. Communication control unit 21 of user station 20 is otherwise identical to communication control unit 11 of user station 10.

Communication control unit 11 is used for controlling a communication of particular user station 10, 20, 30 via bus line 40 with another user station of user stations 10, 20, 30 connected to bus line 40. Checksum generator 12 is used for calculating a checksum, for example a CRC checksum (CRC=cyclic redundancy check), via predetermined bits of messages 3, 4. Before the communication in bus system 1 begins, configuration register 13 stores an initialization value, as is described in greater detail in the following. Communication control unit 11 may be configured as a conventional CAN controller or CAN FD controller. Transceiver 14 may be configured as a conventional CAN transceiver or CAN FD transceiver.

With the aid of the two user stations 20, 30, a formation and then transmission of messages 3 may be implemented with CAN FD, or at higher data rates as CAN FD. User station 10, however, corresponds to a conventional CAN or CAN FD user station in terms of its transmission functionality and reception functionality, and transmits messages 4 according to the present CAN or CAN FD protocol.

Figure 2:
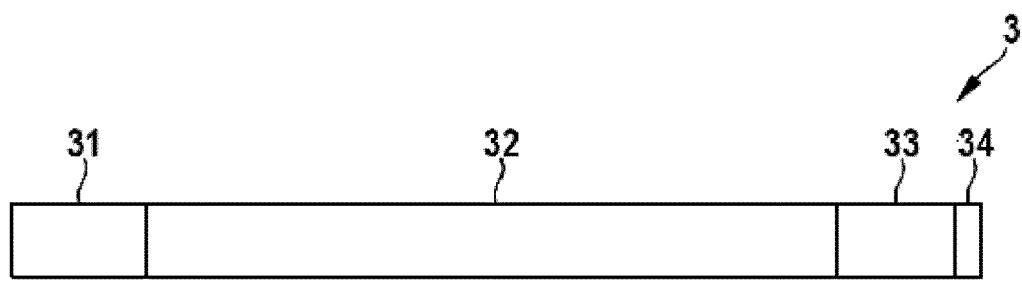
FIG. 2 shows a schematic representation of the configuration of a message in a bus system according to the first exemplary embodiment.

FIG. 2 highly schematically shows the configuration of a message 3. Accordingly, message 3, which is also referred to as a frame, includes a frame header 31, a data segment 32, and a checksum 33 which is followed by frame end 34. Frame header 31 is situated at the beginning of message 3, data segment 32 is situated in the middle, and checksum 33 and frame end 34 are situated at the end of message 3. Checksum 33 is generated or calculated by checksum generator 12. A message 4 is configured in the same way as message 3.

Figure 3:
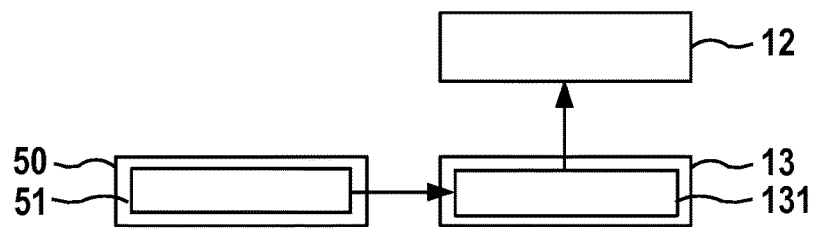
FIG. 3 shows a view for illustrating the function of a configuration register of the bus system according to the first exemplary embodiment.

FIG. 3 illustrates that an initialization value 131 for checksum generator 12 is stored in configuration register 13. Initialization value 131 is arbitrarily changed by a software 51 as necessary before the communication begins in bus system 1. Configuration register 13 is therefore configured as an overwritable memory. User stations 10, 20 therefore do not have an established initialization value, in contrast to user station 10. Software 51 may be stored in an external microcontroller 50 which may be connected to communication control unit 11 and/or communication control unit 21. Microcontroller 50 may be part of particular user station 10, 20 or may be situated externally thereto.

Figure 4:
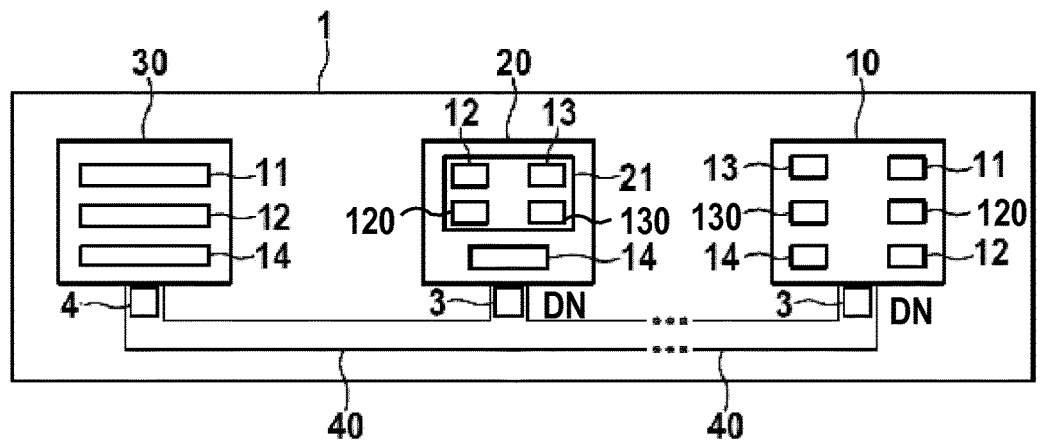
FIG. 4 shows a simplified block diagram of a bus system according to one modification of the first exemplary embodiment.

FIG. 4 shows one modification of the first exemplary embodiment. If checksums 33 having different lengths are calculated in user stations 10, 20, 30, for example a CRC checksum including 17 bits or a CRC checksum including 21 bits, which takes place, in particular, depending on the length of messages 3, 4, user stations 10, 20 have a separate checksum generator 12, 120 for each of the lengths. The same may apply for user station 30, even if this is not represented in FIG. 4. In CAN FD, user stations 10, 20, 30 include a checksum generator 12 for a CRC checksum including 17 bits, which is calculated for a message 3 which has fewer than a predetermined number DN of data bytes in data segment 32 (FIG. 2), such as, for example, 16 bytes. In addition, user stations 10, 20 include one further checksum generator 120 for a CRC checksum including 21 bits, which is calculated for a message 3 which has more than a predetermined number DN of data bytes in data segment 32 (FIG. 2), such as, for example, 20 bytes. In this case, a configuration register 13, 130 including the corresponding initialization value 131 is provided in user stations 10, 20, even for each checksum generator 12, 120. In user station 30, in such a case, a fixed, non-changeable initialization value is provided for the CRC checksum including 17 bits and a fixed, non-changeable initialization value is provided for the CRC checksum including 21 bits.

The present exemplary embodiment and its modification are particularly advantageous when possible initialization values 131 are not yet known or are only partially known. In this case, initialization values 131 may be arbitrarily established, as necessary.

Figure 5:
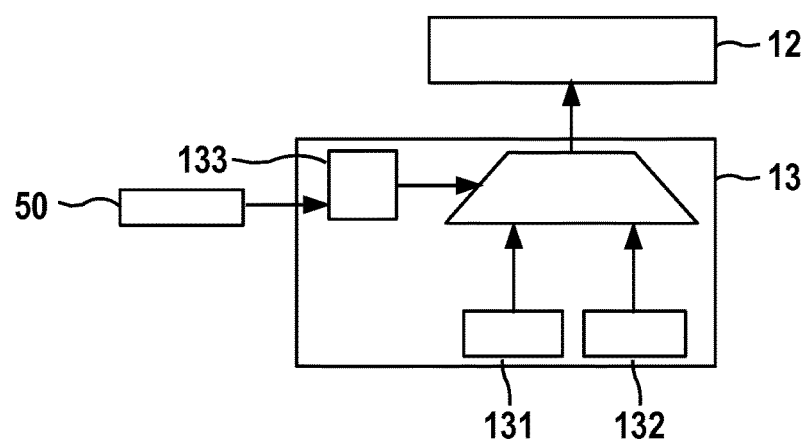
FIG. 5 shows a view for illustrating the function of a configuration register of the bus system according to one second exemplary embodiment.

FIG. 5 shows a configuration register 13 according to one second exemplary embodiment. In this case, two different initialization values 131, 132 are fixedly stored or installed as constants in configuration register 13. Configuration register 13 includes a configuration bit 133 for selecting particular initialization value 131, 132 for a checksum generator 12. The value of configuration bit 133 is set by microcontroller 50 or its software. Assigned initialization value 131, 132 is selected for particular checksum generator 12 depending on the value of configuration bit 133. In this case, a switch between the two different initialization values 131, 132 is carried out with the aid of the at least one configuration bit 133.

In the present exemplary embodiment, further configuration register 130 is configured in the same way as configuration register 13.

Otherwise, the bus system according to the present exemplary embodiment is configured in the same way as described with respect to the first exemplary embodiment.

The present exemplary embodiment is advantageous when possible initialization values 131, 132 are already known.

In one modification of the second exemplary embodiment, more than one configuration bit 133 may also be present. In this case, more than two initialization values 131, 132 may be permanently stored. In this case, a selection may be made between more than two initialization values 131, 132.

According to one third exemplary embodiment, configuration register 13 is configured as described with respect to the first exemplary embodiment. Second or further configuration register 130, however, is configured as described with respect to the second exemplary embodiment. Otherwise, the bus system according to the present exemplary embodiment is configured in the same way as described with respect to the first exemplary embodiment.

All of the above-described embodiments of bus system 1 and user stations 10, 20, 30, and of the method may be utilized individually or in all possible combinations. In particular, all features of the above-described exemplary embodiments and/or their modifications may be arbitrarily combined. In addition, the following modifications, in particular, are conceivable.

Above-described bus system 1 according to the exemplary embodiments is described with reference to a bus system based on the CAN protocol. Bus system 1 according to the exemplary embodiments may also be another type of communication network, however. It is advantageous, although not a necessary precondition, that exclusive, collision-free access by a user station 10, 20, 30 to one shared channel is ensured, at least for certain periods of time, in bus system 1.

Bus system 1 according to the exemplary embodiments is, in particular, a CAN network or a TTCAN network or a CAN FD network.

The number and arrangement of user stations 10, 20, 30 in bus system 1 of the exemplary examples is arbitrary. In particular, only user stations 10 or user stations 20, etc., may be present in bus system 1 of the exemplary embodiments.

What is claimed is:

1. A user station for a bus system, comprising:
a communication control unit to write or read at least one message for or from at least one further user station of the bus system, in which exclusive access by a user station to a bus line of the bus system is provided;
a checksum generator to generate a checksum for the message to detect bit errors in the message; and
a configuration register to specify the initialization value with which the checksum generator is to be preloaded to start the message, wherein the configuration register includes an overwritable memory;
wherein a previously fixed initialization value is changeable even following a communication with the communication control unit, and
wherein the checksum generator of the user station is operable using both the previously fixed initialization value and a new initialization value to be established, so that bit errors in a message of the bus system are reliably detectable by forming the checksum.

2. The user station of claim 1, wherein the configuration register includes at least one changeable configuration bit, and at least two initialization values as permanently stored values, and wherein the at least one changeable configuration bit indicates the at least two initialization values with which the checksum generator is preloaded to start the message.

3. The user station of claim 1, further comprising:
a further checksum generator to generate a checksum for the message to detect bit errors in the message; and
a further configuration register to specify the initialization value with which the further checksum generator is preloaded to start the message;
wherein the checksum generator is configured to generate a checksum for a message, which includes fewer than a predetermined number of data bytes, and
wherein the further checksum generator is configured to generate a checksum for a message, which includes more than the predetermined number of data bytes.

4. The user station of claim 3, wherein the predetermined number of data bytes is 16.

5. The user station of claim 1, wherein the communication control unit includes the configuration register a further configuration register.

6. The user station of claim 1, wherein the at least one message is a CAN FD message.

7. A bus system, comprising:
a parallel bus line; and at least two user stations, which are connected to one another via the bus line so that they can communicate with each other;

wherein at least one of the at least two user stations includes a user station which includes:

a communication control unit to write or read at least one message for or from another one of the at least two user stations of the bus system, in which exclusive access by a user station to a bus line of the bus system is provided;

a checksum generator to generate a checksum for the message to detect bit errors in the message; and a configuration register to specify the initialization value with which the checksum generator is to be preloaded to start the message;

wherein a previously fixed initialization value is changeable even following a communication with the communication control unit, and wherein the checksum generator of the user station is operable using both the previously fixed initialization value and a new initialization value to be established, so that bit errors in a message of the bus system are reliably detectable by forming the checksum.

8. A method for checking a correctness of a message, the method comprising:

writing or reading with a communication control unit of a user station for or from at least one further user station of the bus system, in which exclusive access by a user station to a bus line of the bus system is provided; and specifying, with a configuration register, an initialization value with which a checksum generator is preloaded to start the message, wherein a checksum for the message is to be calculated with the checksum generator to detect bit errors in the message;

wherein a previously fixed initialization value is changeable even following a communication with the communication control unit, and wherein the checksum generator of the user station is operable using both the previously fixed initialization value and a new initialization value to be established, so that bit errors in a message of the bus system are reliably detectable by forming the checksum.

* * * * *